(12) United States Patent
Anastas et al.

(10) Patent No.: US 10,439,187 B2
(45) Date of Patent: Oct. 8, 2019

(54) LAMINAR BATTERY SYSTEM

(71) Applicant: Apple Inc., Cupertino, CA (US)

(72) Inventors: George V. Anastas, San Carlos, CA (US); Gregory A. Springer, Los Altos, CA (US); Jack B. Rector, III, San Ramon, CA (US); Joshua R. Funamura, San Carlos, CA (US); Kenneth M. Silz, Brentwood, CA (US)

(73) Assignee: APPLE INC., Cupertino, CA (US)

( * ) Notice: Subject to any disclaimer, the term of this patent is extended or adjusted under 35 U.S.C. 154(b) by 94 days.

(21) Appl. No.: 15/644,311

(22) Filed: Jul. 7, 2017

(65) Prior Publication Data

US 2017/0309882 A1    Oct. 26, 2017

Related U.S. Application Data

(63) Continuation of application No. 14/041,843, filed on Sep. 30, 2013, now Pat. No. 9,711,770.
(Continued)

(51) Int. Cl.
*H01M 2/00* (2006.01)
*H01M 2/16* (2006.01)
(Continued)

(52) U.S. Cl.
CPC ....... *H01M 2/1653* (2013.01); *H01M 4/0404* (2013.01); *H01M 4/0471* (2013.01); *H01M 10/052* (2013.01); *H01M 10/0562* (2013.01); *H01M 10/0585* (2013.01); *H01M 2/145* (2013.01); *H01M 4/0421* (2013.01); *H01M 6/40* (2013.01); *H01M 2004/021* (2013.01); *H01M 2300/002* (2013.01); *Y10T 29/49108* (2015.01); *Y10T 29/49115* (2015.01)

(58) Field of Classification Search
CPC .. H01M 2/1653; H01M 2/145; H01M 4/0404; H01M 4/0471; H01M 4/0421; H01M 10/052; H01M 10/0562; H01M 10/0585; H01M 6/40; H01M 2004/021; H01M 2300/002
See application file for complete search history.

(56) References Cited

U.S. PATENT DOCUMENTS 3,655,455 A    4/1972  Jones
4,369,225 A    1/1983  Manabe et al.
(Continued)

FOREIGN PATENT DOCUMENTS

CN    1144017    2/1997
CN    1262790    8/2000
(Continued)

OTHER PUBLICATIONS

Zhonghua et al., "Layered Cathode Materials Li [NixLi(1/3-2x/3)Mn(2/3-x/d)]O2 for Lithium-Ion Batteries," Electrochemical and Solid-State Letters, vol. 4, No. 11, 2001, pp. A191-A194.

*Primary Examiner* — Jane J Rhee
(74) *Attorney, Agent, or Firm* — Brownstein Hyatt Farber Schreck, LLP (57) ABSTRACT

A battery system comprises a plurality of substantially planar layers extending over transverse areas. The plurality of layers comprises at least one cathode layer, at least one anode layer, and at least one separator layer therebetween.

21 Claims, 9 Drawing Sheets

Related U.S. Application Data (60) Provisional application No. 61/730,402, filed on Nov. 27, 2012.

(51) Int. Cl.

| | | |
|---|---|---|
| *H01M 4/04* | (2006.01) | |
| *H01M 10/052* | (2010.01) | |
| *H01M 10/0562* | (2010.01) | |
| *H01M 10/0585* | (2010.01) | |
| *H01M 2/14* | (2006.01) | |
| *H01M 6/40* | (2006.01) | |
| *H01M 4/02* | (2006.01) | |

(56) References Cited

U.S. PATENT DOCUMENTS

| | | |
|---|---|---|
| 5,134,046 A | 7/1992 | Chow et al. |
| 5,523,179 A | 6/1996 | Chu |
| 5,554,459 A | 9/1996 | Gozdz et al. |
| 5,561,004 A | 10/1996 | Bates et al. |
| 6,001,138 A | 12/1999 | Dix |
| 6,180,278 B1 | 1/2001 | Prickett |
| 6,200,634 B1 | 3/2001 | Johnsgard et al. |
| 6,319,631 B1 | 11/2001 | Bay et al. |
| 6,410,189 B1 | 6/2002 | Yamada et al. |
| 6,610,572 B1 | 8/2003 | Takei et al. |
| 6,713,987 B2 | 3/2004 | Krasnov et al. |
| 6,893,772 B2 | 5/2005 | Howard |
| 7,297,441 B2 | 11/2007 | Hatta et al. |
| 7,585,582 B2 | 9/2009 | Chen |
| 7,801,613 B2 | 9/2010 | Li et al. |
| 7,927,744 B2 | 4/2011 | Mizutani et al. |
| 7,931,989 B2 | 4/2011 | Klaassen |
| 7,935,439 B2 | 5/2011 | Kim |
| 7,939,195 B2 | 5/2011 | Salot et al. |
| 7,959,769 B2 | 6/2011 | Zhang et al. |
| 7,960,054 B2 | 6/2011 | Zhang et al. |
| 8,044,813 B1 | 10/2011 | Dembo |
| 8,153,301 B2 | 4/2012 | Jiang |
| 8,168,322 B2 | 5/2012 | Krasnov et al. |
| 8,323,828 B2 | 12/2012 | Yamazaki et al. |
| 8,420,252 B2 | 4/2013 | Shakespeare et al. |
| 8,431,264 B2 | 4/2013 | Neudecker et al. |
| 8,435,312 B2 | 5/2013 | Chen |
| 8,435,603 B2 | 5/2013 | Bentley et al. |
| 8,445,130 B2 | 5/2013 | Neudecker et al. |
| 8,475,955 B2 | 7/2013 | Krasnov et al. |
| 8,518,581 B2 | 8/2013 | Neudecker et al. |
| 8,518,583 B2 | 8/2013 | Mizuno et al. |
| 8,580,332 B2 | 11/2013 | Kwak et al. |
| 8,669,345 B2 | 3/2014 | Lee et al. |
| 8,679,674 B2 | 3/2014 | Liang et al. |
| 8,687,336 B2 | 4/2014 | Wang |
| 8,822,059 B2 | 9/2014 | Wang |
| 8,822,069 B2 | 9/2014 | Baek et al. |
| 8,956,761 B2 | 2/2015 | Reynolds et al. |
| 8,993,172 B2 | 3/2015 | Upadhyaya |
| 9,083,048 B2 | 7/2015 | Wang et al. |
| 9,209,451 B2 | 12/2015 | Fukushima |
| 9,525,177 B2 | 12/2016 | Sturgeon et al. |
| 9,570,775 B2 | 2/2017 | Huang et al. |
| 9,601,751 B2 | 3/2017 | Huang et al. |
| 9,711,770 B2 | 7/2017 | Anastas et al. |
| 9,911,947 B2 | 3/2018 | Hong |
| 2001/0032666 A1 | 10/2001 | Jenson et al. |
| 2002/0127362 A1 | 9/2002 | Jansen et al. |
| 2003/0180621 A1 | 9/2003 | Matsumoto |
| 2005/0079418 A1 | 4/2005 | Kelley et al. |
| 2005/0250010 A1 | 11/2005 | Kurihara et al. |
| 2006/0210880 A1 | 9/2006 | Howard et al. |
| 2007/0015060 A1* | 1/2007 | Klaassen ............ H01B 1/122 429/309 |
| 2008/0032236 A1 | 2/2008 | Wallace |
| 2009/0193649 A1 | 8/2009 | Niessen et al. |
| 2009/0208754 A1 | 8/2009 | Chu et al. |
| 2009/0317708 A1 | 12/2009 | Brandl et al. |
| 2010/0035152 A1 | 2/2010 | Sastry et al. |
| 2010/0066683 A1 | 3/2010 | Chang et al. |
| 2011/0123844 A1 | 5/2011 | Bhardwaj et al. |
| 2011/0177398 A1 | 7/2011 | Affinito et al. |
| 2011/0183183 A1 | 7/2011 | Grady et al. |
| 2011/0195271 A1 | 8/2011 | Zadesky et al. |
| 2011/0200868 A1 | 8/2011 | Klaassen |
| 2011/0294015 A1 | 12/2011 | Pirk et al. |
| 2012/0135288 A1 | 5/2012 | Meintschel |
| 2013/0029205 A1 | 1/2013 | Adams |
| 2014/0007418 A1 | 1/2014 | Song |
| 2014/0011067 A1 | 1/2014 | Baba et al. |
| 2014/0147731 A1 | 5/2014 | Anastas et al. |
| 2014/0147737 A1 | 5/2014 | Anastas et al. |
| 2014/0147742 A1 | 5/2014 | Anastas et al. |
| 2014/0264915 A1 | 9/2014 | Huang et al. |
| 2014/0265915 A1 | 9/2014 | Huang et al. |
| 2014/0272190 A1 | 9/2014 | Huang et al. |
| 2014/0272541 A1 | 9/2014 | Huang et al. |
| 2014/0272560 A1 | 9/2014 | Huang et al. |
| 2014/0272561 A1 | 9/2014 | Huang et al. |
| 2014/0273890 A1 | 9/2014 | Huang et al. |
| 2015/0325862 A1 | 11/2015 | Song et al. |
| 2016/0064719 A1 | 3/2016 | Bushnell et al. |
| 2016/0093837 A1 | 3/2016 | Bushnell et al. |
| 2018/0309155 A1 | 10/2018 | Huang et al. |

FOREIGN PATENT DOCUMENTS

| | | |
|---|---|---|
| CN | 1153311 | 6/2004 |
| CN | 101640968 | 2/2010 |
| CN | 101676845 | 3/2010 |
| EP | 0792741 | 9/1997 |
| EP | 0975031 | 1/2000 |
| EP | 1804315 | 7/2007 |
| EP | 2105983 | 9/2009 |
| EP | 2481499 | 8/2012 |
| JP | 61032951 | 2/1986 |
| JP | 63314770 | 12/1988 |
| JP | 2013004173 | 1/2013 |
| JP | 2013021347 | 1/2013 |
| TW | I 306319 | 2/2009 |
| TW | 201010094 | 3/2010 |
| TW | 201014020 | 4/2010 |
| TW | 201108441 | 3/2011 |
| TW | 201218494 | 5/2012 |
| WO | WO 08/007867 | 1/2008 |
| WO | WO 10/033609 | 3/2010 |
| WO | WO 12/086557 | 6/2012 |
| WO | WO 12/090929 | 7/2012 |
| WO | WO 12/114162 | 8/2012 |

\* cited by examiner

LAMINAR BATTERY SYSTEM

CROSS-REFERENCE TO RELATED APPLICATION

This application is a continuation of U.S. patent application Ser. No. 14/041,843, filed Sep. 30, 2013, entitled "Laminar Battery System," which claims the benefit under 35 U.S.C. § 119(e) of U.S. Provisional Patent Application No. 61/730,402, filed Nov. 27, 2012, entitled "Laminar Battery System," the contents of which are incorporated by reference as if fully recited herein.

TECHNICAL FIELD

The subject matter of this disclosure relates generally to electronic devices, and specifically to battery systems for portable electronics and mobile devices. In particular, the disclosure relates to battery systems with particular energy density, form factor and overall size and weight requirements.

BACKGROUND

Batteries come in a range of different architectures and forms, including traditional rod-and-tube (dry cell) and flat plate (flooded cell) designs, as well as "jelly roll" configurations in which the anode and cathode layers are laid down on opposite sides of a flat sheet or flexible substrate and rolled up for insertion into the battery case or pouch. In flat battery designs, the rolled anode and cathode structure is folded into a low-profile casing or pouch, which is sealed along one or more sides.

Battery configurations for portable electronics and mobile devices require a range of design tradeoffs, including size, weight, power consumption, manufacturability, durability and thermal loading. In general, the amount of energy or storage capacity per battery weight (or volume) can also be an important factor, because a greater energy/battery weight or volume ratio makes for a better, longer lasting battery

SUMMARY

Exemplary embodiments of the present disclosure include battery systems, and methods of making the battery systems. The battery systems may comprise a plurality of substantially planar layers extending over a transverse area. The plurality of layers may include at least one cathode layer, at least one anode layer, and at least one separator layer therebetween.

DETAILED DESCRIPTION

Figure 1:
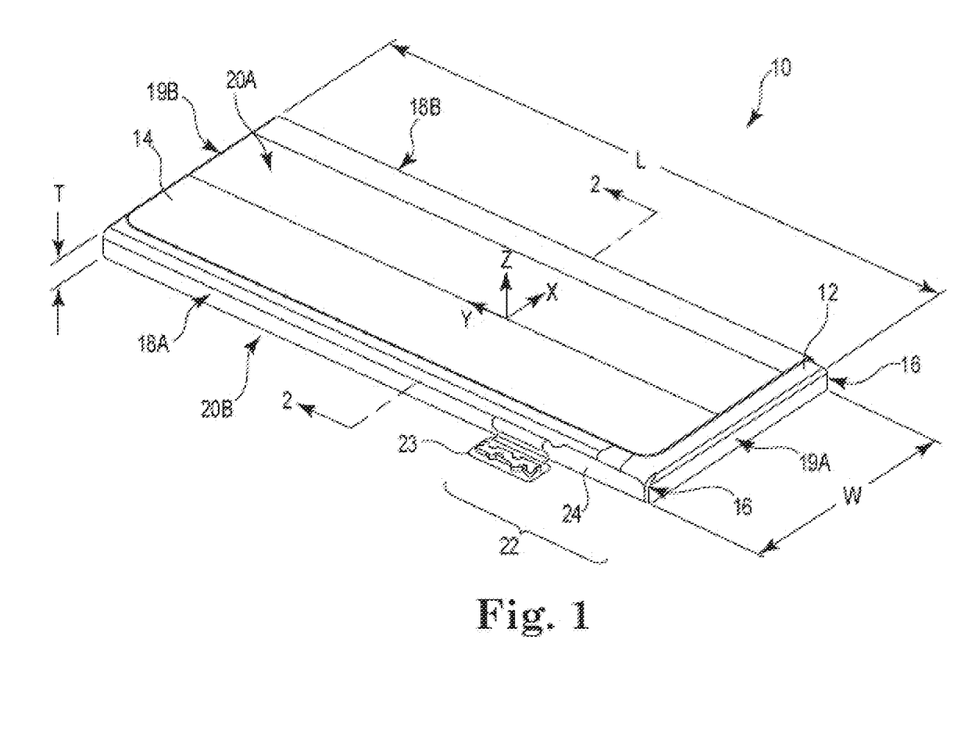
FIG. 1 is a perspective view of a battery with increased energy density and improved form factor.

FIG. 1A is a perspective view of battery assembly 10 with pouch or outer casing 12 and protective wrap or film 14, which may be used for shipping, or for protection from damage and corrosion. An encapsulant or other sealing material 16 may be utilized to seal battery casing 12 to prevent leakage of electrolytes and other materials from the inside of battery assembly 10, to inhibit moisture intrusion, and to reduce oxidation and corrosion of the anode and cathode surfaces.

In the particular configuration of FIG. 1, battery assembly 10 has a substantially oblong or rectangular geometry or form factor, with width W defined between opposite sides 18A and 18B, length L defined between opposite sides or ends 19A and 19B, and thickness T defined between opposite major surfaces 20A and 20B. The battery core is provided within casing 12, and is configured for increased energy density, as described below, within an improved form factor (or volume envelope), as defined by length L, width W and thickness T.

Length L and width W are typically measured along first and second major surfaces 20A and 20B of battery system 10, in the direction of (horizontal) axes x and y, excluding the thickness of protective wrapper or film 14. Similarly, height or thickness T is measured between major surfaces 20A and 20B, along (vertical) axis z, also excluding protective wrapper 14.

In low-profile or flat configurations of battery assembly 10, thickness T is generally less than length L or width W, so that major surfaces 20A and 20B have substantially greater surface area than side and end surfaces 18A, 18B. 19A and 19B. The orientation of coordinate axes x, y, and z is arbitrary, however, and the various dimensions of length L, width W, and thickness T may also be interchanged, depending on configuration.

Connector 22 provides electrical power and signal connections to battery assembly 10, for example in a "pig tail" configuration with a connector board 23 coupled to battery assembly 10 via flex circuit 24, as shown in FIG. 1. Depending on application, connector 22 and flex circuit 24 may be configured to accommodate a range of different connection geometries, for example along a side surface (e.g., side 18A or 18B) or an end surface (e.g., end 19A or 19B) of battery casing 12, or at a corner interface (e.g., between side 18A and end 19A, as shown in FIG. 1).

Where battery dimensions including length L, width W, and thickness T are constrained, increased energy density provides battery system 10 with greater storage capacity within a given form factor, and longer service life between charges. Increased energy density also allows for reducing the form factor at a given storage capacity, or a combination of increased capacity and reduced battery dimensions, for overall improvements in both battery life and form factor or size envelope.

Figure 2:
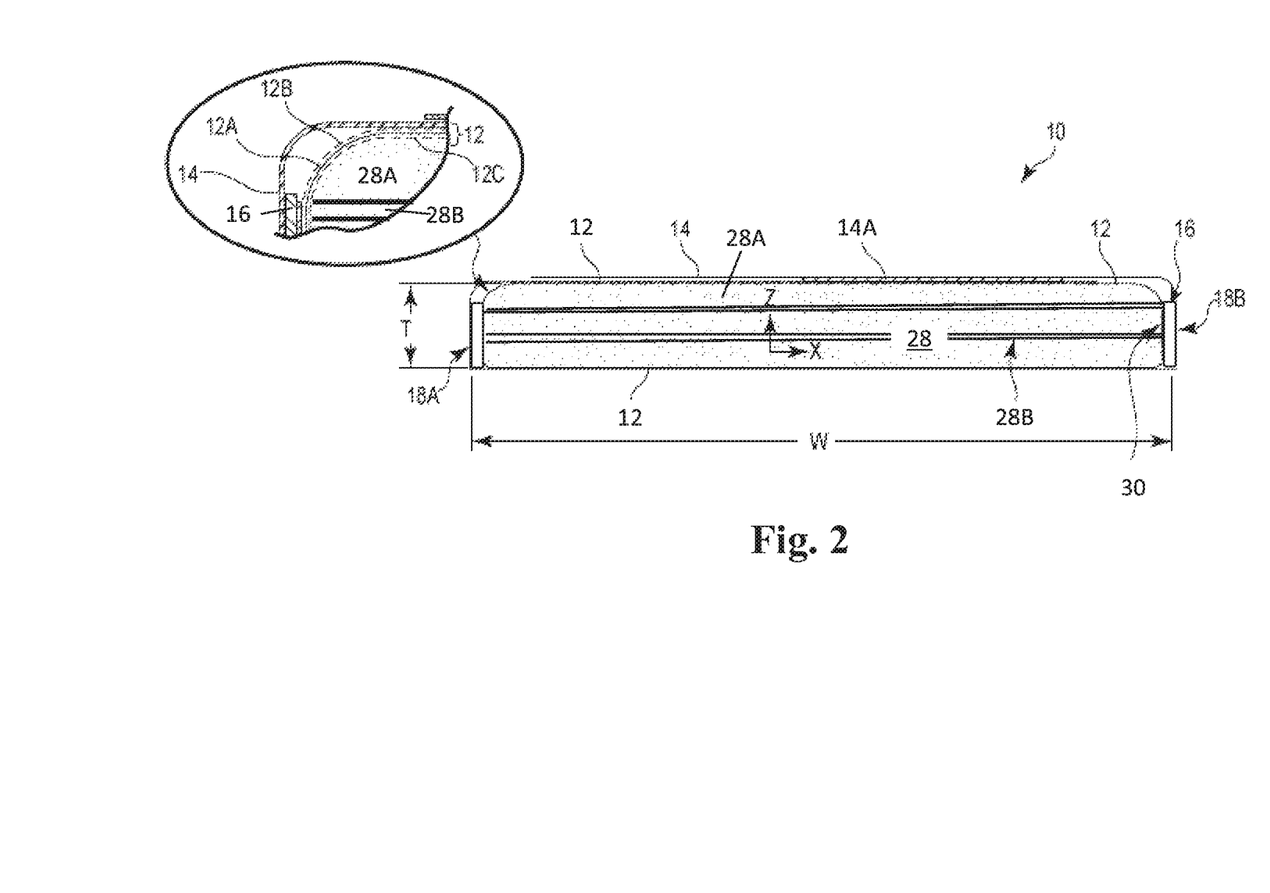
FIG. 2 is a cross-sectional view of the battery.

FIG. 2 is a cross-sectional view of battery system (battery assembly or battery) 10, taken along line 2-2 of FIG. 1. Battery case or pouch 12 is formed about inner battery element or core 28, which stores electrical energy and provides voltage and current. Protective wrapper 14 may be formed of an thin polymer sheet, for example a polyethylene terephthalate (PET) film, and provided to cover battery 10 during shipping, for example utilizing insignia 14A for identification.

Battery casing 12 is typically formed of a laminated material, for example an aluminum alloy core layer 12A with plastic or polymer insulating layers 12B and 12C on the inner and outer surfaces. Typically, core layer 12A provides strength, durability and structural integrity, and while coating layers 12B and 12C provide electrical insulation and chemical protection from caustic materials in battery core 28, for example acid or alkali electrolytes or other active components 28A. Alternatively, battery casing 12 may be formed of a polymer material, or using an encapsulant, conformal coating or sealant material, for example as described with respect to sealing material 16.

Battery core 28 comprises a laminated structure, as shown in FIG. 2, with active materials 28A interspersed between inactive or passive materials 28B. Active materials 28A include at least one or both of the cathode and anode layers, as described in more detail below. Inactive materials 28B may include spacers, insulators or substrate materials, which separate the anode and cathode pads. Although three layers of active material 28A and two spacer layers 28B are shown, the number of individual layers varies, depending on the design of battery system 10 and battery core 28, and additional or fewer layers are contemplated.

To improve the energy density and storage capacity of battery system 10, battery core 28 is provided with an improved laminated structure to increase the relative volume of active materials 28A, as compared to inactive or passive (spacer) materials 28B. This also contrasts with rolled battery core designs, for example, where there are substantial side roll regions, with relatively low energy density. In the laminar structure of battery core 28, on the other hand, active and passive layers 28A and 28B are substantially planer across most or substantially of the full length and width (that is, transverse area) of battery core 38, including end regions 30.

This laminar and substantially planar configuration for battery core 28 substantially reduces spacing issues presented by building anode and cathode layers into a rolled core configuration, where (1) there is a substantial amount of side roll that does not significantly contribute to battery capacity, and (2) there is a substantial spacing between the anode and cathode pads, which is required to prevent shorting in the high curvature side roll regions.

In contrast, active and passive layers 28A and 28B of battery core 28 are substantially flat and planar across substantially the full length and width of battery assembly 10, as shown in FIG. 2, increasing capacity by providing relatively more substantially planar area in battery core 28, with relatively higher energy density and more efficient energy storage. The substantially planar, laminar configuration of battery core 28 also reduces the non-planar side roll areas, as provided in a rolled core design, and which have relatively lower energy density and relatively less efficient energy storage. These effects may be particularly relevant in flat-profile form factor designs, as shown in FIGS. 1 and 2, where the side roll curvature is high, and only the relatively straight or planar portions of the battery core significantly contribute to overall battery capacity and storage capability.

Laminar, substantially planar battery core 28 also reduces the required spacing between the anode and cathode pads, because tolerance is easier to maintain across the flat-plane structure of active and passive material layers 28A and 28B, as compared to a rolled design, with reduced risk of the anode and cathode pads accidentally touching, and shorting out the battery. This also increases energy storage density, by providing more active material 28A per unit volume of battery core 28, including relatively more cathode thickness or volume, as compared to passive material 28B.

Figure 3:
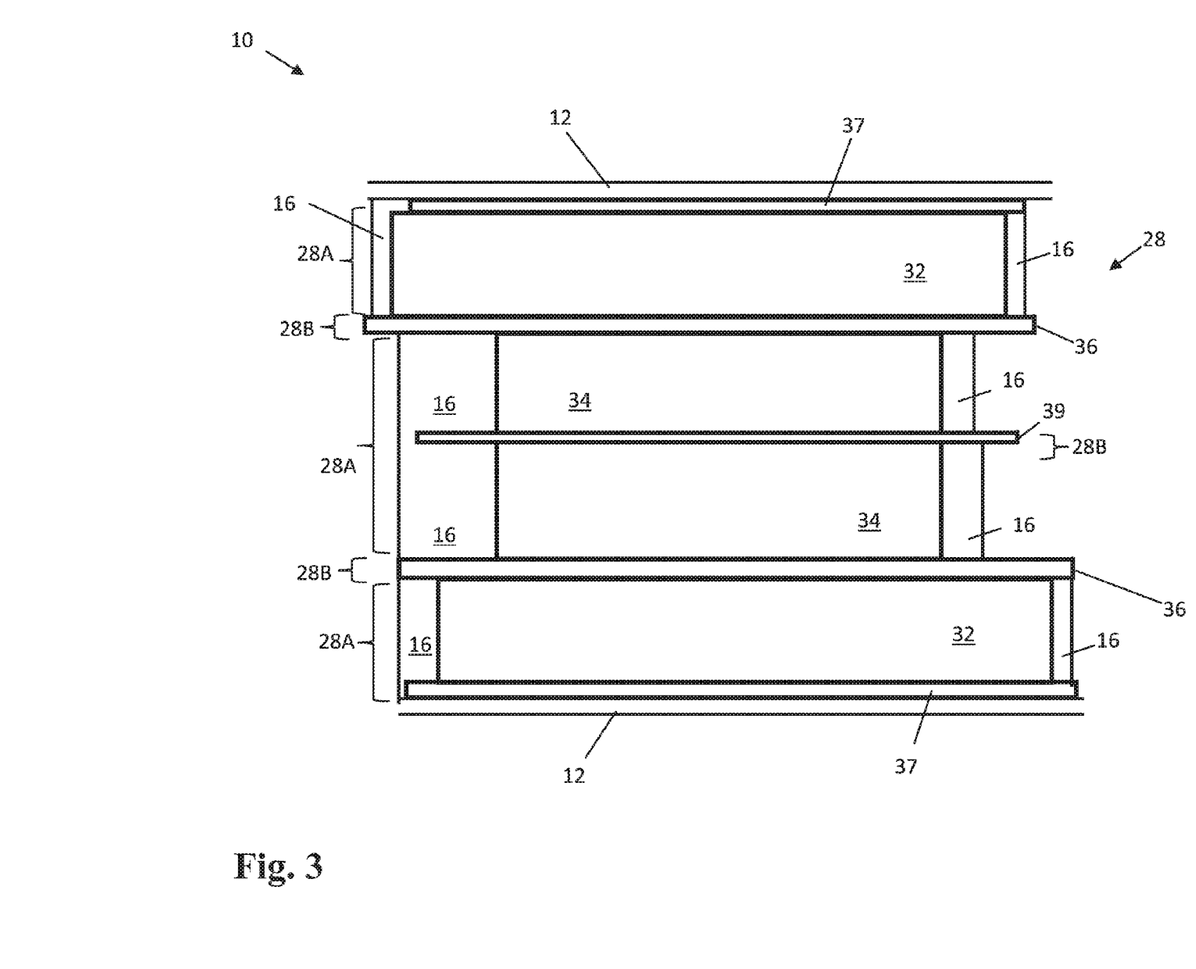
FIG. 3 is an enlarged cross-sectional view of the battery, showing the laminar structure of the battery core.

FIG. 3 is an enlarged cross-sectional view of battery 10, showing the internal laminar structure of battery core 28. As shown in FIG. 3, battery core 28 is formed with alternating layers of active material 28A and passive materials 28B, for example insulators or substrates, positioned between upper and lower portions of battery casing 12, and encapsulated with an epoxy, polymer, or other encapsulating material 16.

Battery casing 12 provides a mechanical, electrical and chemical barrier to isolate battery core 28 of battery 10, as described above. Depending on embodiment, battery casing 12 may extend along the sides of battery core 28, as shown in FIGS. 1 and 2, or encapsulating material 16 may be exposed on the sides, as shown in FIG. 3. Encapsulating material 16 may also be provided in a range of different thicknesses, and applied either across the full height or thickness of battery core 28, as shown on the left side of FIG. 3, or distributed across individual layers 28A of active material, as shown in the right side of FIG. 3.

Active material 28A is formed of anode layers 32 and cathode layers 34, spaced apart by separator layers 36. Pads or conductor (collector) layers 37 and 39 are provided adjacent anode and cathodes 32 and 34, respectively. As shown in FIG. 3, the top and bottom anode/cathode structures have an inverted or double-sided stack orientation, with adjacent cathode layers 34 separated by a single anode pad layer 39.

Thus, three layers of active material 28A are shown, including two anode layers 32 and two cathode layers 34, separated by two spacer layers 36. Alternatively, additional or fewer anode, cathode, spacer, and collector layers 32, 34, 36, 37, and 39 may be included. In additional configurations, collector layers 37 and 39 may be defined as either active or passive material, in which case the example of FIG. 3 could be considered to have three or four active layers 28A, and two or three passive or inactive layers 28B.

Anode layers 32 and cathode layers 34 are formed of suitable anode and cathode materials including, but not limited to, lithium cobalt oxide, lithium iron phosphate, lithium manganese oxide, lithium, lithium metal phosphates, carbon, and graphite, for example graphite infused with lithium ions. In one particular configuration, for example, anode layer 32 is formed of lithium, and cathode layer 34 is formed of lithium cobalt oxide. Alternatively, anode layer 32 may be formed of lithium cobalt oxide, or another lithium or metal oxide material, and cathode layer 34 may be formed of graphite. Depending on the charging or discharging state of battery 10, moreover, charge flow in anode and cathode layers 32 and 34 may reverse, as described below, without loss of generality.

Separator layer 36 is formed of a suitable insulating separator material that is permeable to ion transport, for example a porous polymer or microporous polyethylene lithium ion transport material, or a paper or fibrous composite material.

Anode and cathode pads or collector layers 37 and 39 may be formed of suitable conducting metals such copper or aluminum. Alternatively, the lithium anode may be utilized, at least charge transport inside batter core 28.

Separator layer 36 may be permeated with an electrolyte having suitable ion transport properties, for example ethylene carbonate or diethyl carbonate containing lithium ion complexes. In lithium and lithium ion applications of battery 10, the electrolyte is typically non-aqueous, in order to avoid reacting with any lithium metal components of battery core 28.

Carbon nanotube materials may also be used, for example extending from the anode base (layer 32 or 37), so that lithium ions are maintained by attachment to the (conducting) carbon nanotube material. This contrasts with other designs, were lithium may be eaten away or otherwise lost from anode layer 32 or anode collector (or pad 37), raising the risk of a short or other battery fault. Where a sufficient level of lithium is maintained, using carbon nanotubes or other lithium retention elements in one or both of anode layer 32 and anode collector layer 37, battery 10 remains effective over periods of extended use, including repeated charge and drain cycles.

In discharge operations of battery 10, for example oxidation may take place in anode layer 32, so that anode layer 32 functions as a negative electrode. Thus, anode collector 37 may have a relatively negative charge, providing electron flow to the external circuit. Reduction reactions may take place in cathode layer 34, so that cathode layer 34 functions as a positive electrode. Thus, cathode collector 39 may have a relatively positive charge, accepting electron flow from the external circuit. In secondary battery systems 10, recharging operations may be supported, where the current flow and oxidation reduction reactions are reversed. The charge flow in (or designations of) anode layer 32 and cathode layer 34 may also be reversed, depending on usage and nomenclature, and as described above.

Figure 4:
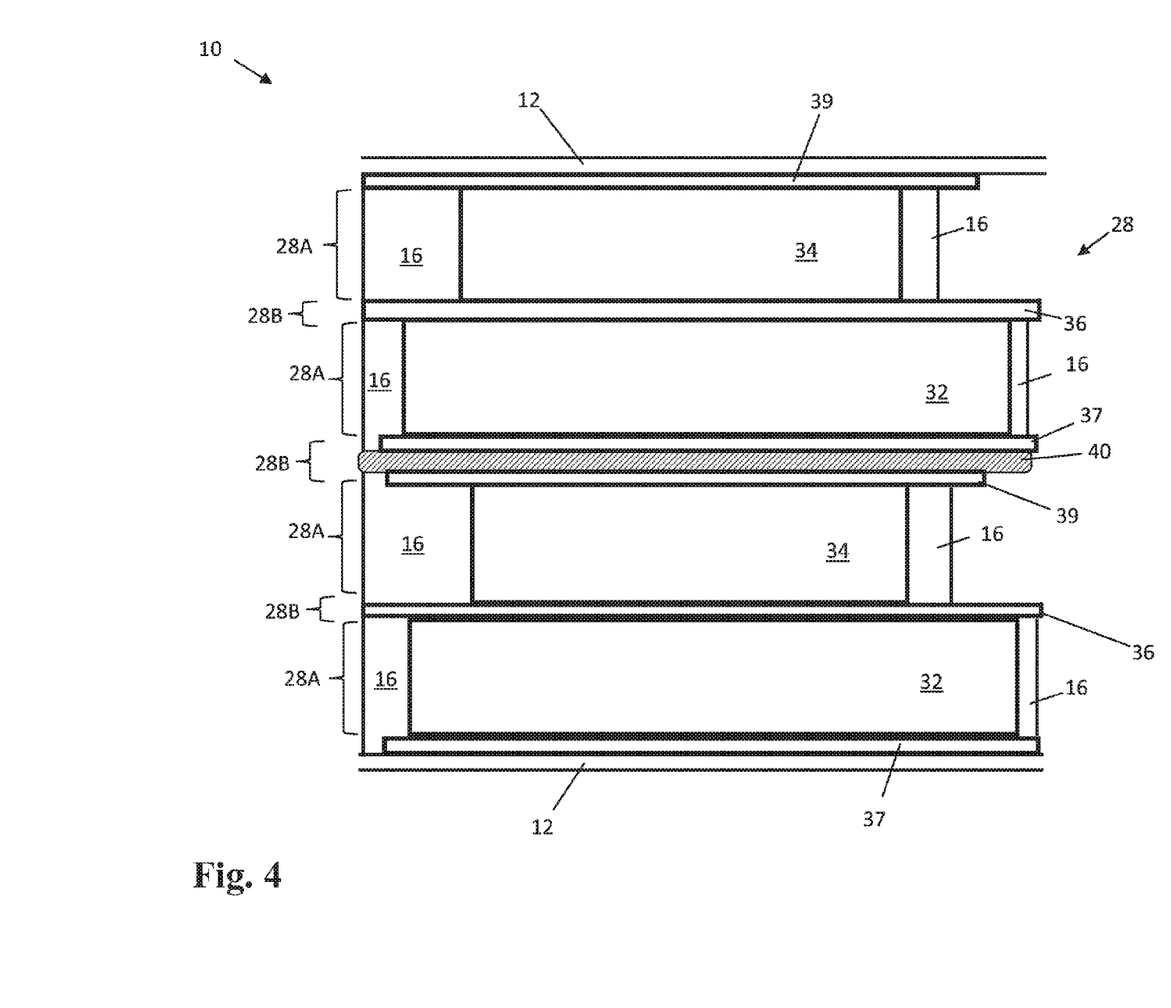
FIG. 4 is an alternate cross sectional view of the battery, showing the laminar core structure in an alternating anode/cathode layer configuration.

FIG. 4 is an alternate cross-sectional view of battery 10, showing the internal laminar structure of battery core 28 in a non-inverted or single-sided stack configuration. In this design, anode layers 32 and cathode layers 34 alternate across the height of battery 10, between top and bottom battery casings 12. An additional insulating spacer layer 40 is provided between adjacent anode carrier layer 37 and cathode carrier layer 39. Again, the number of individual layers is arbitrary, and may be increased or decreased depending on layer thickness, battery configuration, and battery form factor.

The design of FIG. 4 has a substantially uniform layering configuration, with separate anode and cathode carrier layers 37 and 39 for each anode layer 32 and cathode layer 34, respectively. An additional spacer, insulator, or insulating substrate layer 40 may be included, adding to the relative volume of passive material layers 28B, but any such increase may be relatively nominal because the planar structure of battery core 28 does not require additional spacing tolerance to accommodate high curvature end regions, as characteristic of rolled battery core designs.

For example, in some rolled battery core designs, a minimum tolerance of about 20 microns or more is required between adjacent anode and cathode pads or carrier layers 37 and 39, in order to reduce the risk of shorting in end-roll regions with high curvature. In other designs, the required tolerance may be even greater, for example more than about 50 microns, or even more than about 100 microns. In the substantially planar configuration of battery core 28, however, there is little or substantially no curvature, and the minimum required thickness for inter-pad (insulation) layer 40 may be less than 20 microns, for example about 10 microns or less, or about 8 microns or less.

Figure 5:
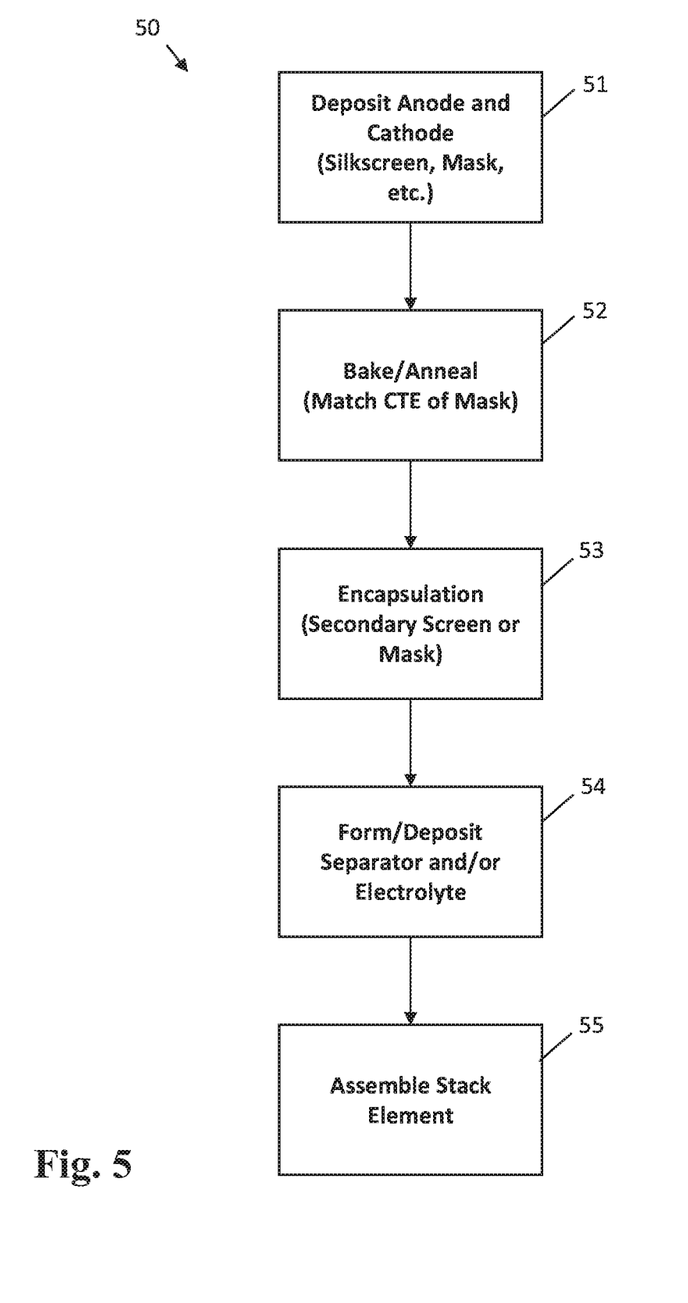
FIG. 5 is a schematic diagram of a method for producing a laminar battery core.

FIG. 5 is a schematic diagram of method 50 for producing a laminar battery core, for example laminar core 28 of battery assembly 10, as shown in FIGS. 1-4, and as described above. Method 50 includes one or more steps selected from deposition (step 51), baking or annealing (step 52), encapsulation (step 53), adding electrolyte and separator (step 54), and completing the battery core or core stack element (step 55).

Deposition (step 51) may include depositing an anode slurry on an anode collector or anode collector substrate, depositing a cathode slurry on a cathode collector or cathode collector substrate, or both. The lateral dimensions of the deposited anode and cathode materials may be defined by positioning a screen or electrode mask with respect to the collector substrates. The thickness or depth d of the anode and cathode layers may be controlled by translating a silkscreen blade or other mechanical element across the mask or screen, as illustrated in step 51 of FIG. 5.

Baking/Annealing (step 52) may include heating the mask or masks with the anode or cathode slurry materials in order to anneal or harden the materials into a suitable form for use in a battery or battery core stack. Depending on embodiment, a nickel iron alloy such as INVAR or KOVAR may be utilized for the mask, or another material with a low or particularly selected (matched) coefficient of thermal expansion (CTE), in order to maintain particular dimensions with respect to the anode and cathode material during the heating in step 52, and in any subsequent cooling process.

Encapsulation (step 53) may include removing the electrode mask and positioning a secondary or encapsulation mask with respect to the anode or cathode layers, and/or the corresponding collector substrates. An encapsulant such as a thermoplastic or other polymer may then be deposited about the anode and cathode layers based on the encapsulation mask geometry. The encapsulant may be cured by heating, ultraviolet radiation, or chemical means. Alternatively, a self-curing encapsulant compound may be utilized, for example an epoxy resin.

Electrolyte and separator components are added in step 54. For example, a permeable separator material may be applied to either or both of the anode or cathode layer, and the separator material may be saturated or permeated with an electrolyte material. Additional encapsulant may also be applied along the separator layer.

In step 55, the anode and cathode layers are joined in an adjacent relationship to form a laminated battery core element, with the electrolyte-permeated separator positioned between adjacent anode and cathode layers, and the electrode and cathode collector layers positioned on the electrode and cathode layers, respectively. In general, the collector layer may be positioned opposite the separator layer, as defined across the respective anode and cathode layers.

The individual core stack elements can be assembled in a variety of different configurations to form the battery core, for example as described above with respect to FIGS. 3 and 4, above, and in FIGS. 6A-6C, 7A-7C, and 8-10, below. Suitable techniques include, but are not limited to, optical positioning, robotic positioning, optical device assembly techniques, and other suitable positioning techniques for assembly battery core or core stack 28.

The laminated core structure of battery 10 and method 50 provides a more uniform battery core structure than a rolled battery design, with more precise control of critical dimensions including individual layer thicknesses. By reducing thickness requirements in the separator and other passive or inactive components, moreover, energy density is increased, for improved performance within a given form factor or volume envelope.

Battery lamination method 50 also provides a greater selection range for individual (active and passive) layer thicknesses, including thicker active anode and cathode layers. In thicker and "superthick" embodiments, the battery core is more "z efficient," with a higher density of active materials along the vertical (thickness) dimension of the battery core, perpendicular to the individual layers, and between the major surfaces in a flat profile battery design.

Limitations on layer thickness are primarily based on manufacturing considerations, and mask-to-mask (or roll to roll) variations. There may also be a relationship between anode and cathode thickness and ion transport capability. Where thicker anode and cathode layers may be achieved by silk screening or other lamination methods 50, edge deterioration effects may be mitigated using a conformal coating or encapsulant to seal the edges of the battery core, as described above.

Figure 6A:
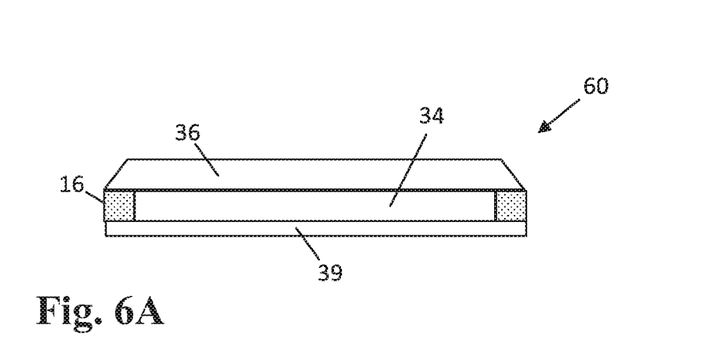
FIG. 6A is a cross-sectional illustration of a cathode layer for a laminar battery core.

FIG. 6A is a cross-sectional illustration of cathode layer 34 for a laminar battery core, for example battery core 28 of FIGS. 1-4. A relatively thick layer of cathode material 34 is deposited on cathode substrate 39, for example lithium cobalt oxide material using a masking or screening process, as described above, or via another process such as sputtering or chemical vapor deposition (CVD). Encapsulant or conformal coating material 16 may be applied to seal the sides or edges of cathode layer 12.

A separator/electrolyte or ion transport layer 36 can be deposited on top of cathode layer 34, opposite cathode substrate layer 39. Depending upon application, a lithium phosphate, lithium phosphorous, or lithium phosphorous oxynitride (LiPON or $LiPO_xN_y$) material may be utilized for separator layer 36, for example to replace the traditional lithium ion transfer electrolyte and separator material with a glassy or thin film solid electrolyte separator layer 36. In additional configurations, a lithium polymer battery configuration may be utilized, using a lithium-salt type electrolyte in a substantially solid polymer composite for separator layer 36.

Figure 6B:
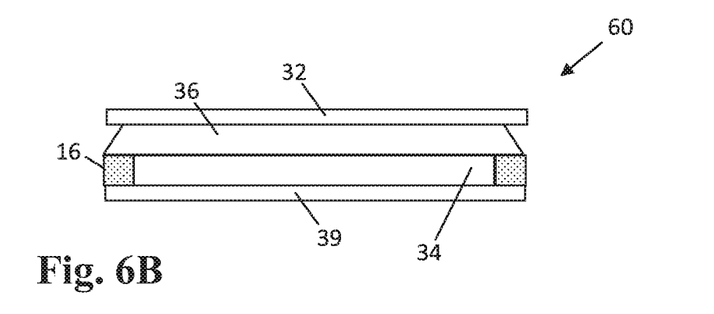
FIG. 6B is a cross-sectional illustration of anode and cathode layers for the laminar battery core.

FIG. 6B is a cross-sectional illustration of anode and cathode layers 32 and 34 for laminar battery core 28. Anode layer 32 is formed on separator layer 36, opposite cathode layer 34, for example by physical vapor deposition (PVD) or powder deposition of a lithium material. Alternatively, anode layer 32 may be formed of different material such as graphite, and anode layer 32 may be applied via a screening or masking method, for example as described above with respect to method 50 of FIG. 5.

Figure 6C:
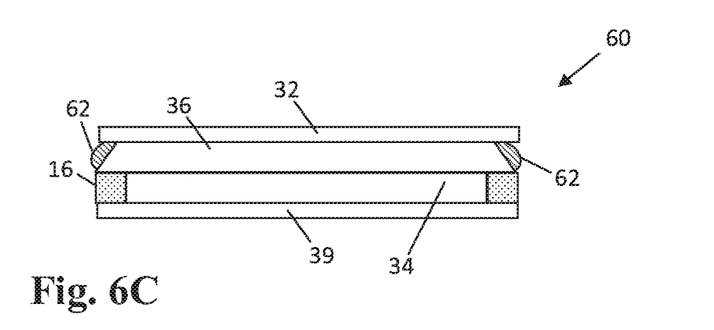
FIG. 6C is a cross-sectional illustration of a core stack element for the laminar battery core, with anode and cathode layers, anode collector and flexible sealant.

FIG. 6C is a cross-sectional illustration of battery core element 60, including anode and cathode layers 32 and 34 separated by separator layer 36. Battery core element 60 also includes anode and cathode collector layers 37 and 39, as positioned adjacent to and in electrical contact with anode and cathode layers 32 and 34, respectively, opposite separator layer 36. Encapsulant or conformal coating 16 and flexible sealant 62 are provided to seal the sides of battery core element 60, including cathode layer 32, separator layer 36, and anode layer 32.

Flexible sealant 60 may be formed of an insulating material such as a room temperature vulcanizing (RTV) silicone or other silicone or polymer-based material, or an encapsulant or conformal coating. Similar, encapsulant 16 may be formed of a flexible sealant, such as RTV silicone or other silicone or polymer based material.

Figure 7A:
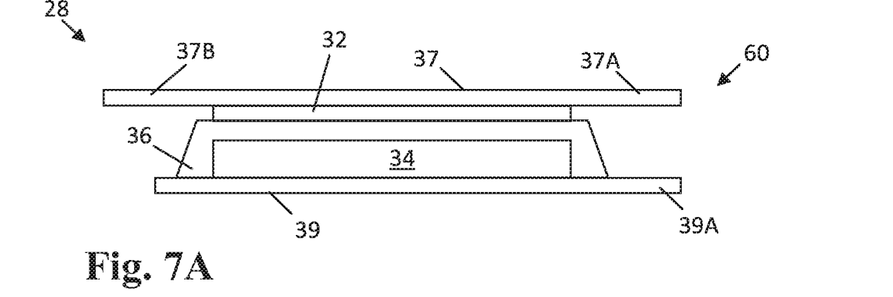
FIG. 7A is a schematic illustration of the laminar battery core stack, illustrating different external connector configurations.

FIG. 7A is a schematic illustration of core stack element 60, illustrating different external connector configurations. As shown in FIG. 7A, anode collector 37 may extend to external connection point 37A on the same side of stack element 60 as cathode collection point 39A, as defined for cathode collector 39. Alternatively, anode collector 37 may extend to external connection point 37B, on the opposite side of stack element 60 with respect to cathode collection point 39A.

Figure 7B:
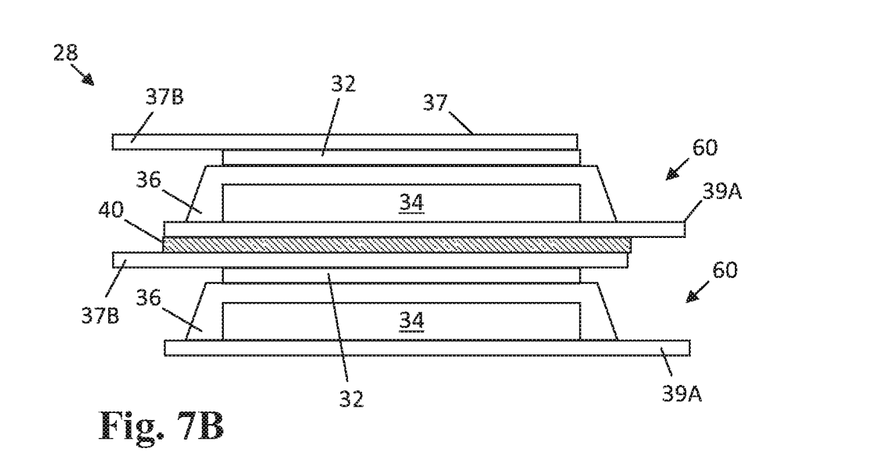
FIG. 7B is a schematic illustration of the laminar battery core stack, in a single-side stack configuration.

FIG. 7B is a schematic illustration of battery core 28, in a single-side stack configuration. In this configuration, individual stack elements 60 are stacked together in the same orientation, with anode collectors 37 extending to anode connection points 37B along one side of battery core (or stack) 28, and cathode collectors 39 extending to cathode connection points 39A on the opposite side of battery core (or stack) 28. This allows all the cathode lines to be coupled to a single cathode output, and all the anode lines to be coupled to a single anode output, thus making the battery have a single cathode and a single anode.

Figure 7C:
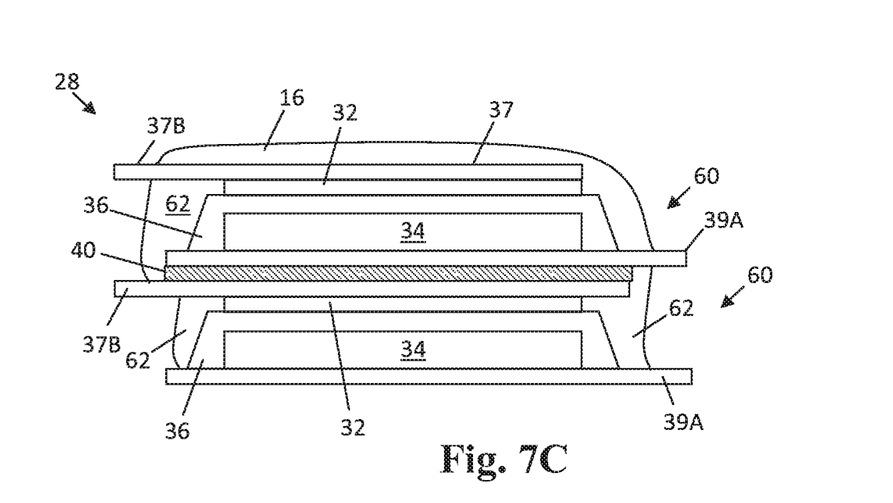
FIG. 7C is a schematic illustration of the single-side stack configuration, illustrating representative layer thicknesses.

FIG. 7C is a schematic illustration of battery core 28 in the single-stack configuration, illustrating representative layer thicknesses (in microns). In this particular configuration, cathode layer 34 has a thickness of about 10 microns, or about 25% of the total stack thickness of about 40 microns, including two conformal coating or encapsulation layers 16 of about 3 microns each, anode and cathode collector layers (or substrates) 37 and 39 of about 8 microns each, separator layer 36 of about 2 microns, and anode layer 32 of about 6 microns.

This results in a net or average cathode stacking efficiency of about 25% or more for battery core (or stack) 28, as defined by the fraction of the battery thickness occupied by cathode layers 34. This result is substantially higher than in other battery designs, providing battery core 28 (and battery 10) with greater energy storage density and capacity. In thicker embodiments, cathode layer 34 may have a thickness of up to 25 microns or more, or more than 40% of the total stack thickness, for example about 45% of the total stack thickness.

Figure 8:
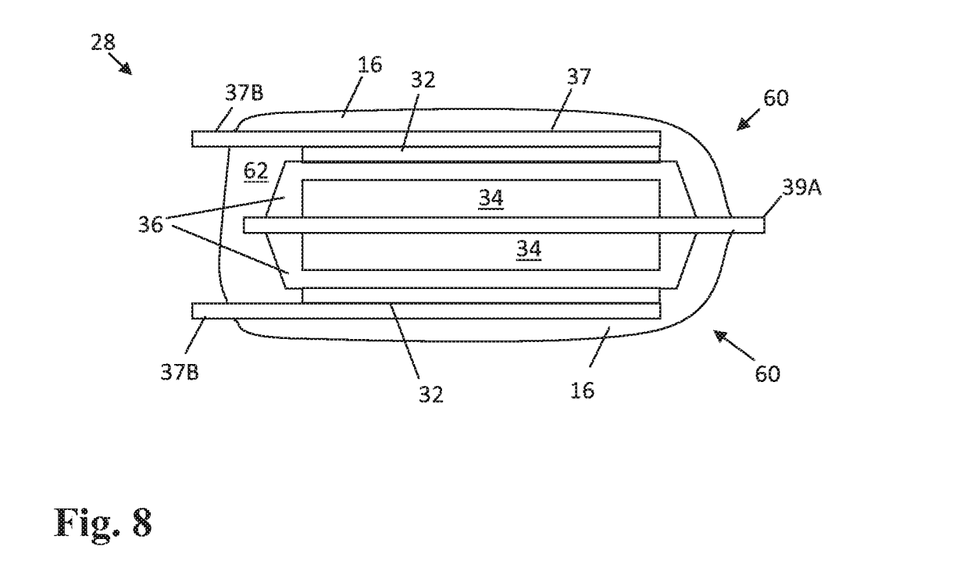
FIG. 8 is a schematic illustration of the laminar battery core stack, in a double-sided configuration.

FIG. 8 is a schematic illustration of battery core (or core stack) 28 in a double-sided stack configuration. In this example, one core or stack element 60 is inverted with respect to the other, as described above with respect to FIG. 3, using a single cathode collector 39 between two adjacent cathode layers 34. In this configuration, the vertical cathode efficiency may be about 30% or more (about 30.3%), based on two cathode layers 34 with a total thickness of about 20 microns, in a stack with two anode layers 34 at about 6 microns each, two separator layers 36 at about 2 microns each, two conformal coating layers 16 at about 3 microns each, two anode collectors 37 at about 8 microns each, and only one cathode collector 39 at about 8 microns (about 66 microns total). For thicker cathode designs of up to 25 microns or more, the cathode stacking efficiency may be higher, for example about 50% or more.

Figure 9:
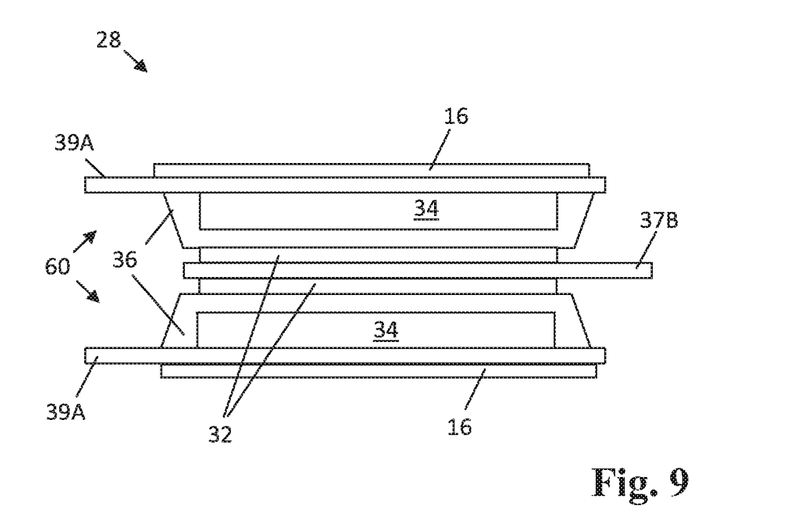
FIG. 9 is a schematic illustration of the laminar battery core stack, in a single-sided, double stack configuration.

FIG. 9 is a schematic illustration of battery core or stack 28 in a single-sided, double stack configuration. This is similar to the example of FIG. 8, but with stack elements 60 inverted so that a single anode collector 37 is positioned between two adjacent anode layers 32. The relative stacking thicknesses are approximately the same, as described above with respect to FIG. 8, resulting in a vertical cathode stacking efficiency of about 30% (or 30.3%)

Figure 10:
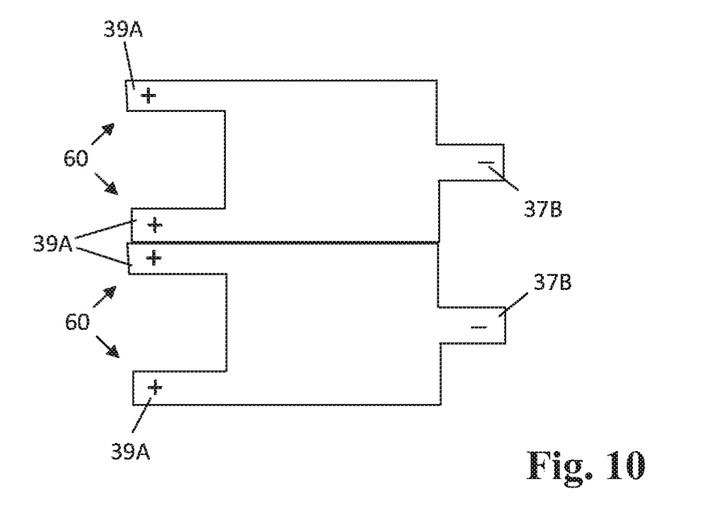
FIG. 10 is a schematic illustration of the laminar battery core stack, in a multi-stack configuration.

FIG. 10 is a schematic illustration of battery core or stack 28, in a multi-stack configuration. In this particular example, battery stack 28 includes two separate instances of the single-sided, double stack configuration of FIG. 9. Alternatively, battery stack 28 may comprise one, two, three, four or more core stack elements, using any of the stacking configurations shown in FIG. 3, 4, 7A-7C, 8, or 9.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents

We claim:

1. A battery assembly, comprising:
    a first anode current collector;
    first anode active material coupled to the first anode current collector;
    a first cathode current collector;
    first cathode active material coupled to the first cathode current collector;
    a first separator positioned between the first anode active material and the first cathode active material;
    a second anode current collector positioned adjacent the first cathode current collector without anode active material positioned therebetween;
    second anode active material coupled to the second anode current collector;
    a second cathode current collector;
    second cathode active material coupled to the second cathode current collector; and
    a second separator positioned between the second anode active material and the second cathode active material.

2. The battery assembly of claim 1, wherein the battery assembly has a thickness less than 100 microns.

3. The battery assembly of claim 1, further comprising a spacer positioned between the second anode current collector and the first cathode current collector.

4. The battery assembly of claim 1, wherein the battery assembly has a cathode active material stacking efficiency of at least about 30% of a thickness of the battery assembly.

5. The battery assembly of claim 1, further comprising an encapsulant that at least partially encapsulates the first anode current collector, the first anode active material, the first cathode current collector, the first cathode active material, the first separator, the second anode current collector, the second anode active material, the second cathode active material, and the second separator.

6. The battery assembly of claim 5, wherein portions of the first anode current collector, the first cathode current collector, and the second anode current collector extend through the encapsulant.

7. The battery assembly of claim 1, wherein the first anode current collector and the second anode current collector extend from a surface of the battery assembly and the first cathode current collector and the second cathode current collector extend from an opposing surface of the battery assembly.

8. A battery core, comprising:
    a first anode current collector with first anode active material coupled thereto;
    a cathode current collector with cathode active material coupled thereto;
    a separator positioned between the first anode active material and the cathode active material; and
    a second anode current collector with second anode active material coupled thereto positioned adjacent the cathode current collector without anode active material positioned between the second anode current collector and the cathode current collector.

9. The battery core of claim 8, wherein the separator covers multiple surfaces of the cathode active material.

10. The battery core of claim 8, wherein the separator has sloped sides.

11. The battery core of claim 8, further comprising an ion transport layer positioned between the second anode current collector and the cathode current collector.

12. The battery core of claim 8, wherein the cathode active material has a thickness of approximately 10-30 microns.

13. The battery core of claim 8, wherein the battery core has an anode active material stacking efficiency of at least about 30% of a thickness of the battery core.

14. The battery core of claim 8, wherein the battery core has a thickness less than 50 microns.

15. A battery, comprising:
    first and second cells each comprising:
        an anode current collector;
        anode active material coupled to the anode current collector;
        a cathode current collector;
        cathode active material coupled to the cathode current collector; and
        a separator positioned between the anode active material and the cathode active material; and
    an insulating spacer; wherein the first and second cells are coupled such that:
        the cathode current collector of the first cell is positioned adjacent the anode current collector of the second cell; and
        the insulating spacer is positioned between the cathode current collector of the first cell and the anode current collector of the second cell.

16. The battery of claim 15, further comprising a coating of rubber, silicone, or polymer that at least partially surrounds the first and second cells.

17. The battery of claim 15, wherein the cathode active material comprises at least 40% of a thickness of the battery.

18. The battery of claim 15, further comprising an electrolyte positioned between the cathode current collector of the first cell and the anode current collector of the second cell.

19. The battery of claim 15, further comprising a third cell coupled to the second cell wherein the cathode current collector of the second cell is positioned adjacent the anode current collector of the third cell.

20. The battery of claim 15, wherein the cathode current collector of the first cell is separated from the anode current collector of the second cell.

21. The battery of claim 15, wherein the cathode active material is thicker than the anode active material.

* * * * *